W. F. DREIBELBIS.
CHICKEN FEEDER.
APPLICATION FILED FEB. 10, 1914.

1,119,413.

Patented Dec. 1, 1914.
2 SHEETS—SHEET 1.

Witnesses
L. P. Moyer
C. R. Ziegler

Inventor
Walter F. Dreibelbis
By Joshua R. H. Potts
Attorney

THE NORRIS PETERS CO., PHOTO-LITHO., WASHINGTON, D. C.

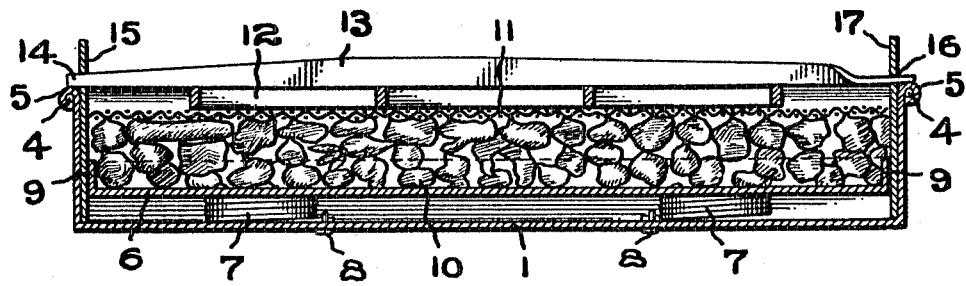
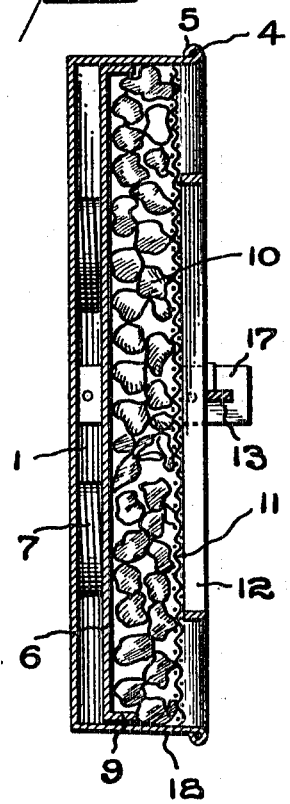
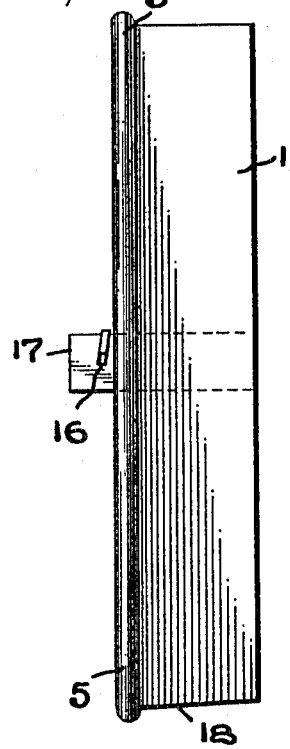

UNITED STATES PATENT OFFICE.

WALTER F. DREIBELBIS, OF ROYERSFORD, PENNSYLVANIA.

CHICKEN-FEEDER.

1,119,413.

Specification of Letters Patent.

Patented Dec. 1, 1914.

Application filed February 10, 1914. Serial No. 817,770.

*To all whom it may concern:*

Be it known that I, WALTER F. DREIBELBIS, a citizen of the United States, residing at Royersford, in the county of Montgomery and State of Pennsylvania, have invented certain new and useful Improvements in Chicken-Feeders, of which the following is a specification.

My invention relates to improvements in chicken feeders, the object of the invention being to provide a device which presents any food of relatively large size to the fowls in a sanitary manner, permitting the fowl to remove but a relatively small particle at a time, and holding the food out of all contact with the filth of the poultry yard.

A further object is to provide a chicken feeder which is especially adapted for feeding vegetables, meat, bread, ears of green sweet corn, lettuce, or other food left over from the table, and which will be maintained in a clean and sanitary condition, and yet pressed close to the inner face of a wire screen, so that the fowls may have access thereto.

With these and other objects in view, the invention consists in certain novel features of construction and combinations and arrangements of parts as will be more fully hereinafter described and pointed out in the claims.

Figure 1:
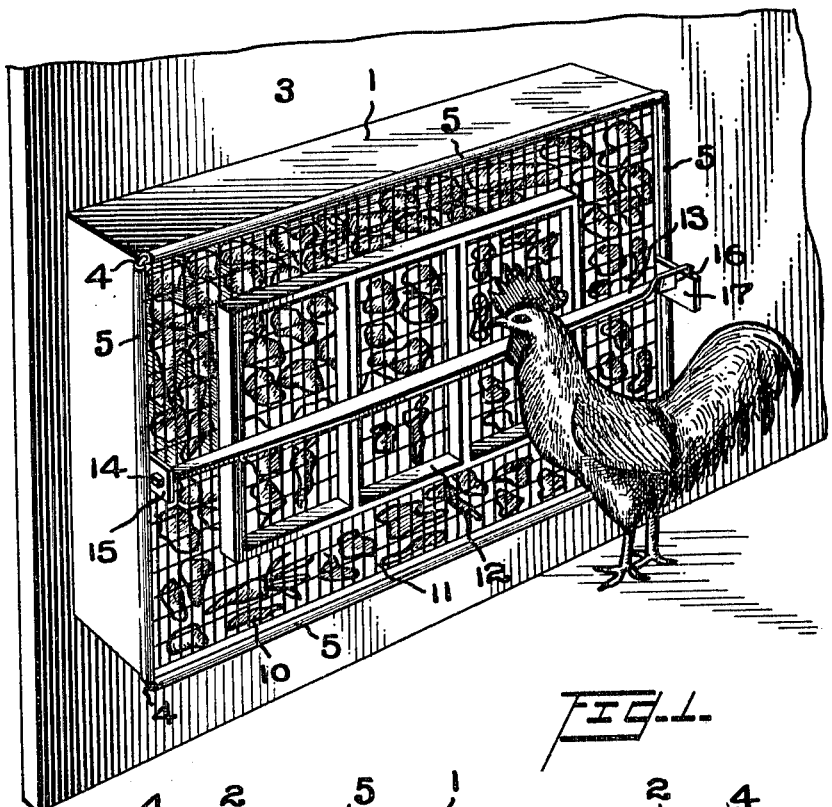
Figure 2:
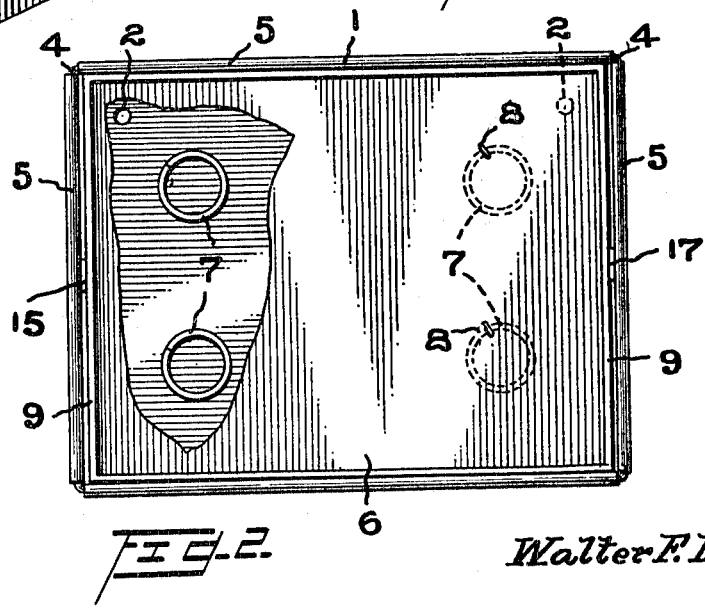

In the accompanying drawings: Figure 1 is a perspective view illustrating my improvements. Fig. 2 is a plan view of the device with the screen and covering frame removed showing the spring-pressed tray partly broken away. Fig. 3 is a view in longitudinal section. Fig. 4 is a view in transverse section at right angles to Fig. 3, and Fig. 5 is an end elevation.

1 represents a rectangular casing having openings 2 in the back thereof for the reception of any suitable supporting devices (not shown) so that the casing may be held against a wall 3 in a vertical position out of contact with the ground, but in easy reach of the fowls as shown clearly in Fig. 1.

The outer edge of the casing 1 is preferably reinforced by a wire 4 inclosed within the outwardly turned edge 5 of the casing. Within the casing 1, a spring-pressed tray 6 is located, and back of this tray, a plurality of coiled springs 7 are positioned between the tray and the back of the casing. These springs are preferably connected to both the tray and the casing by staples as indicated at 8, but the construction is such that they may be readily disconnected as desired.

The tray 6 is provided at its edges with outwardly projecting flanges 9, and against this tray 6, the articles of food illustrated at 10 are positioned. A wire screen 11 is located against the food, and a metal frame 12 is held against the screen by means of a bar 13. This bar 13 has a reduced end 14 located in a perforated lug 15 secured to one end of the casing, and the other end of the bar is projected into an inclined recess 16 in an ear 17 secured to the other end of the casing so as to securely hold the parts together.

In placing the food on the tray, it is of course desirable that the device may be in a horizontal position. After removing the bar 13, frame 12, and screen 10, the articles of food may be located on the tray, the wire screen is then located against the food, the frame 12 against the wire screen, and then the bar 13 is brought into use to press the parts rearwardly against the action of springs 7. The springs 7 therefore exert a continuous pressure against the tray to force the food against the netting.

I would call attention to the fact that the netting is of mesh in which the spaces are longer in their vertical dimension than in their horizontal. This is desirable to allow the fowl to open its bill and grasp the food, but the screen will prevent the fowl from drawing therethrough any but relatively small particles, hence large pieces of food cannot be dragged around the yard and become even so filthy that the fowls themselves will not eat it.

By reason of the inclined recess 16, the pressure of the springs tends always to hold the bar 13 in its locked position, and it will be noted that the frame 12 is of general rectangular form, but appreciably smaller than the screen, so that the fowls can get at the food around the outside of the frame as well as through it. Furthermore, it will be noted that the bar 13 holds the frame in such a position that the screen with the food back of it is maintained a distance inwardly from the outer edge of the casing, hence in case of rain or snow, the food is protected and maintained in a sanitary condition for use at all times. The bottom 18 of the casing slopes downwardly from its rear to its front edge as seen clearly in Fig. 4, so that any moisture which accumulates in the casing will drain from the bottom thereof.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A chicken feeder comprising a casing having an open front, a vertically disposed spring-pressed tray in said casing, a screen in the casing in front of the tray between which and the tray the food is adapted to be located, a frame against the screen, and a bar connected at its ends to the casing and bearing against the outer face of the frame holding the latter within the confines of the casing, substantially as described.

2. A chicken feeder comprising a casing having an open front, a vertically disposed spring-pressed tray in said casing, a screen in the casing in front of the tray between which and the tray the food is adapted to be located, a frame against the screen, ears on the ends of the casing, one of said ears having an opening, and the other an inclined recess, and a bar bearing against the outer edge of the frame and having one end positioned in the opening and the other end in the recess, substantially as described.

3. A chicken feeder comprising a rectangular casing having an inclined bottom, a tray located in the casing, a series of coiled springs between the tray and the back of the casing exerting outward pressure on the tray, a screen in front of the tray between which and the tray the articles of food are adapted to be positioned, said screen having openings therein of a greater dimension vertically than horizontally, ears on the ends of the casing, a bar supported in the ears, and a spacing device interposed between the bar and screen against which the screen is held by the spring, substantially as described.

4. A chicken feeder comprising a rectangular casing having an inclined bottom, a tray located in the casing, a series of coiled springs between the tray and the back of the casing exerting outward pressure on the tray, a screen in front of the tray between which and the tray the articles of food are adapted to be positioned, said screen having openings therein of a greater dimension vertically than horizontally, a rectangular frame located against the outer face of the screen and appreciably smaller than the casing, and a bar secured at its ends to the ends of the casing and located in front of the frame, substantially as described.

In testimony whereof I have signed my name to this specification in the presence of two subscribing witnesses.

WALTER F. DREIBELBIS.

Witnesses:
C. A. LAUNER,
U. S. G. FINKBINER.

Copies of this patent may be obtained for five cents each, by addressing the "Commissioner of Patents, Washington, D. C."